(12) United States Patent
Alieiev et al.

(10) Patent No.: US 11,979,770 B2
(45) Date of Patent: May 7, 2024

(54) SYSTEM, VEHICLE, APPARATUSES, METHODS, AND COMPUTER PROGRAMS FOR USER EQUIPMENT AND FOR SERVICE PROVISION IN A MOBILE COMMUNICATION SYSTEM

(71) Applicants: Volkswagen Aktiengesellschaft, Wolfsburg (DE); MAN Truck & Bus SE, Munich (DE)

(72) Inventors: Roman Alieiev, Stendal (DE); Ernst Zielinski, Bochum (DE); Andreas Pfadler, Berlin (DE); Joakim Cerwall, Stockholm (SE)

(73) Assignees: VOLKSWAGEN AKTIENGESELLSCHAFT, Wolfsburg (DE); MAN TRUCK & BUS SE, Munich (DE)

( * ) Notice: Subject to any disclaimer, the term of this patent is extended or adjusted under 35 U.S.C. 154(b) by 234 days.

(21) Appl. No.: 17/601,977

(22) PCT Filed: Apr. 3, 2020

(86) PCT No.: PCT/EP2020/059675
§ 371 (c)(1),
(2) Date: Oct. 7, 2021

(87) PCT Pub. No.: WO2020/207932
PCT Pub. Date: Oct. 15, 2020

(65) Prior Publication Data
US 2022/0217574 A1  Jul. 7, 2022

(30) Foreign Application Priority Data
Apr. 12, 2019 (EP) .................... 19169068

(51) Int. Cl.
*H04W 28/02* (2009.01)
*H04W 72/52* (2023.01)

(52) U.S. Cl.
CPC ....... *H04W 28/0268* (2013.01); *H04W 72/52* (2023.01)

(58) Field of Classification Search
CPC .................. H04W 72/52; H04W 28/0286
(Continued)

(56) References Cited

U.S. PATENT DOCUMENTS

2014/0099978 A1  4/2014 Egner et al. ............... 455/456.6

FOREIGN PATENT DOCUMENTS

WO  2020/207932 A1  10/2020

OTHER PUBLICATIONS

"3rd Generation Partnership Project: Technical Specification Group Services and System Aspects: Study on Enhancement of 3GPP Support for 5G V2X Services (Release 16)," Technical Report, 3GPP TR 22.886, V16.1.0, 76 pages, Sep. 21, 2018.

(Continued)

*Primary Examiner* — Angel T Brockman
(74) *Attorney, Agent, or Firm* — Slayden Grubert Beard PLLC

(57) ABSTRACT

Embodiments relate to a system, a vehicle, apparatuses, methods, and computer programs for user equipment, UE, and service provision in a mobile communication system. The method (10) for user equipment (100), UE, in a mobile communication system (400), comprises using (12) a service with a set of quality of service, QoS, requirements in the mobile communication system (400), receiving (14) information related to a future course of the QoS provisioning of the service from the mobile communication system (400), and adapting (16) the service based on the information (Continued)

related to the future course of the QoS and based on the set of QoS requirements.

13 Claims, 3 Drawing Sheets

(58) Field of Classification Search
USPC .......................................................... 370/230
See application file for complete search history.

(56) References Cited

OTHER PUBLICATIONS

Continental Automotive GmbH, "Discussion of Physical Layer Aspects of QoS Prediction for NR V2X," 3GPP TSG RAN WG1 Meeting #95, Spokane, WA, R1-1813112, 4 pages, Nov. 12, 2018.
Nokia, et al., "NWDAF/NEF Service for QoS Prediction Notification," SA WG2 Meeting #132, S2-1903766, Xi'an, China, 3 pages, Apr. 8, 2019.
International Search Report and Written Opinion, Application No. PCT/EP2020/059675, 12 pages, Jun. 12, 2020.
European Office Action, Application No. 19169068.4, 7 pages, Mar. 24, 2022.

SYSTEM, VEHICLE, APPARATUSES, METHODS, AND COMPUTER PROGRAMS FOR USER EQUIPMENT AND FOR SERVICE PROVISION IN A MOBILE COMMUNICATION SYSTEM

CROSS-REFERENCE TO RELATED APPLICATIONS

This application claims priority to European Patent Application No. EP 191 69 068.4, filed on Apr. 12, 2019 with the European Patent Office. The contents of the aforesaid patent application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The present invention relates to a system, a vehicle, apparatuses, methods, and computer programs for user equipment, UE, and service provision in a mobile communication system, more particularly, but not exclusively, to a concept for determining and using information related to a future course of a quality of service (QoS) for a service in a mobile communication system.

Conventional concepts may evaluate certain statistics on the network traffic and service characteristics and then base radio resource management on the outcome of the evaluation. The instantaneous or short-term service characteristics or QoS requirements of a specific user service are usually not considered or estimated.

SUMMARY

There is a need for an improved concept for using predicted QoS in a mobile communication system. The need is addressed by the subject matter of the independent claims.

Embodiments of the invention are described in the dependent claims, the following description, and the drawings.

DESCRIPTION

Figure 1:
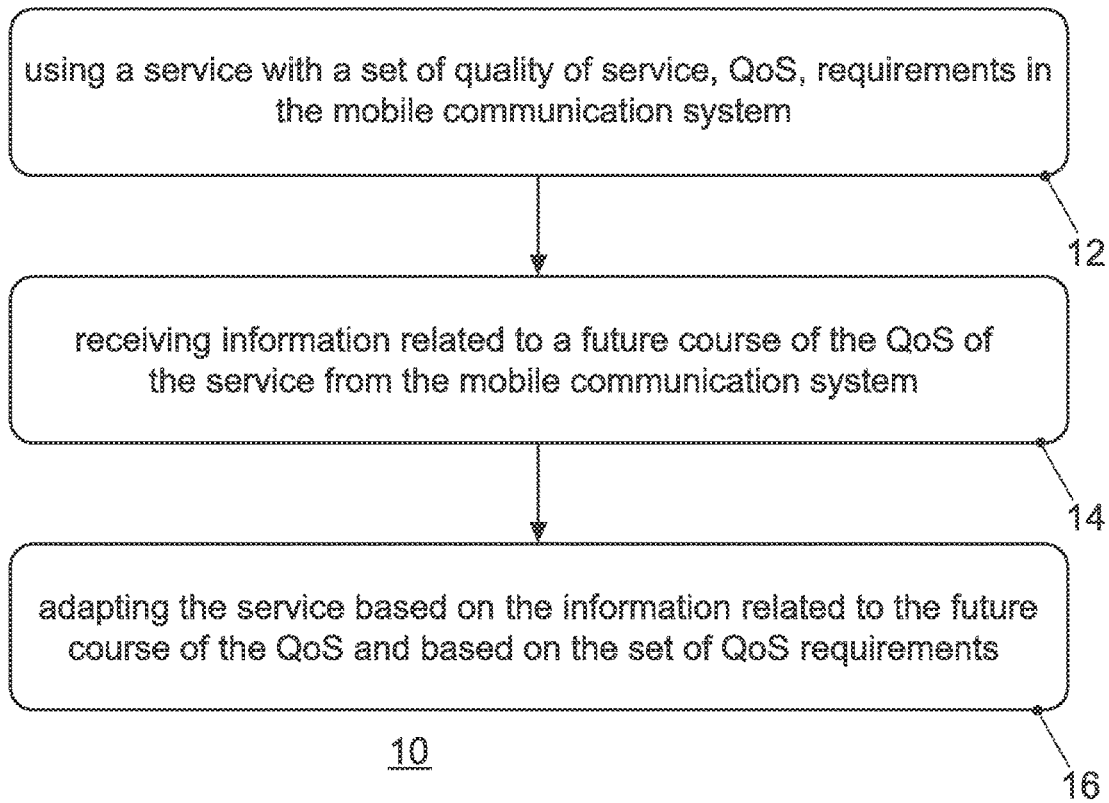
FIG. 1 illustrates a block diagram of an embodiment of a method for user equipment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Some embodiments are based on the finding that on a user side QoS requirements for a certain service can be predicted and adopted according to the service capabilities of a provider beforehand and in a coordinated way. Furthermore, service settings can be adapted, e.g., a resolution of a video service may be adapted. Instead of setting a QoS requirement for a worst-case scenario (highest expected data rate, lowest expected latency), both service requirements and service provisioning change over time and may be adapted by adapting the service. At the user side such changes may be evaluated, and the service may be prepared for it accordingly. The network can predict a possibility to provide a future QoS of an existing service and can inform a user of a future time course of the QoS. With the knowledge of the future time course of the QoS provisioning from the network and the service requirements the user can be provided with an opportunity to adapt the service in advance. For example, in a tele-operated driving scenario the network may inform the user/vehicle that the data rate for tele-operated driving is not going to be available a certain time before the data rate is reduced, the user may take certain actions such as informing a service controller to obtain new relaxed service requirements (switching to another driving mode (autonomous, manual), change parameters for tele-operated driving (reduce speed, reduce video resolution/data rate)) or even changing to a different access technology. In general, once a prediction of a QoS is enabled, according services can be adapted or terminated, rather than having sudden service interruptions. This may improve the service stability, availability and hence its overall efficiency.

Some embodiments provide a method for user equipment, UE, in a mobile communication system. The method comprises using a service with a set of quality of QoS requirements in the mobile communication system. The method comprises receiving information related to at least one future course of the QoS provisioning for the service from the mobile communication system. The method further comprises adapting the service (e.g., requirements and provisioning strategy) based on the information related to the at least one future course of the QoS and based on the set of QoS requirements. Embodiments enable a UE to foresee a future misalignment between a QoS requirement of a service and the QoS, which could be provided. Service adaptation in advance can be carried out.

In some embodiments, the information related to the future course comprises information related to a predicted future trend of the QoS. Hence, a UE can be provided with QoS forecast for a certain time in advance. Additionally or alternatively, the information related to the future course of the QoS may comprise at least one confidence level or confidence indicator for a predicted future trend of the QoS at a certain time or for a certain time period. The UE is enabled to take a confidence of the network for the future QoS trend into account and is further enabled to decide on service adaptation based on said confidence level or confidence indicator.

The information related to the future course may comprise a first higher or more precise confidence level or confidence indicator for a predicted QoS at a first earlier time $t_1$ and a second lower or less precise confidence level or confidence indicator for a predicted QoS at a second later time $t_2$. For the case when the first value has higher confidence indicator and/or confidence level, the short time prediction may be more reliable than the long-term prediction. The number of confidence levels or confidence indicators may be more than two, it may be discrete, or it may be represented by a continuous function. The function can be over future time, over space, over trajectory, it may be projected to other network user behaviors or to other possible evolving trends, where other possibilities are conceivable, and the function is not limited to these examples. The UE may be enabled to determine a sounder decision on potential service adaptations. It is to be noted that in some embodiments the situation may be vice versa. A short time prediction may be less reliable than a long-term prediction, e.g., when the UE is approaching a location in which a network capacity is higher (smaller cells, higher bandwidth, extra carrier, etc.), the prediction on a minimum data rate may be more reliable at a later location than at an earlier location of a UE (e.g., in a vehicle or train).

The information related to the future course may comprise a reference to one or more predefined courses in some embodiments. Signaling overhead may be reduced by using predefined courses of QoS, which can be referenced by the signaling.

On the UE side the method may further comprise receiving information related to one or more predefined courses of QoS. By using a reference to a predefined course signaling overhead and signaling latency may be reduced. Embodiments may provide means for signaling adaption with respect to control information data rate and control information latency.

For example, embodiments may use information related to the one or more predefined courses that relates to one or more functions over time. Using functional relations of QoS and time may further enhance the signaling as functional relation can be described by referencing and according function and signaling functional parameters, so the UE can determine the future QoS time course based on the function.

In some embodiments, the information related to the one or more predefined courses may relate to a codebook indicating different time courses of QoS. Codebook-based signaling may further enhance signaling efficiency. By referencing pages of a predefined codebook, different predefined QoS characteristics or time courses can be selected. In some embodiments the codebook may be semi-statically adapted, e.g., using higher layer signaling the codebook can be defined and faster lower layer signaling can be used to reference pages of the codebook. The codebook itself can then be adapted to the load or traffic situation of the network. The network may predict a future location or other relevant parameters of a UE, e.g., along a train track or highway, and may then adapt the codebook based on the predicted location and statistical or historical data for said location. In further embodiments, the information related to the one or more predefined courses may relate to a dynamic lane model or to a graph. Such a model or graph may be used to further reduce the signaling overhead since both sides know the model or graph and steps or movements within the model or graph can be signaled more efficiently.

The information related to the future course may comprise information related to a QoS of a service to be initiated over a certain time interval in some embodiments. If a service is to be initiated a certain time interval for the service can be expected, for example, a minimum or average time interval for such a service can be predicted based on statistical data or a service history. If such a service is requested in some embodiments the UE is provided with a QoS prediction and course over said time interval to enable the UE to decide on whether to start the service or to adapt the service, its request, respectively. For example, such prediction may comprise forecasted related parameters, such as expected values, confidence levels, type of expected distribution over multiple realizations at the given time-space, type of expected distribution over one realization of the current driving path, etc. For example, service initiation might rely on a future time which is the minimum reasonable service time. Even the short term or near future QoS may be reasonable in some embodiments, the initiation of a service might not make sense because the service duration would be to short when during the minimum service time an operator is not able to provide a required QoS.

Some embodiments also provide a method for service provision in a mobile communication system. Such service provision may be coordinated by a network component, e.g., a base station, a relay station, a cluster head of a cluster of UEs, etc. The method comprises determining at least one future course of QoS for a service being provided to a UE in the mobile communication system. The method further comprises transmitting information related to the at least one future course of the QoS to the UE. The method further comprises receiving information related to service adaption from the UE. Embodiments enable service adaptation in advance to service degradation for a UE.

For example, the determining comprises predicting the future course based on a history of QoS for the service of the UE. In some embodiments statistical QoS data, e.g., based on time of day, location, day of the week, etc., may be used to predict the future time course of QoS for the service of a UE.

The determining may comprise predicting the future course based on a predicted trajectory of the UE and former QoS data along the predicted trajectory. Service adaptation may be based on experience of QoS development along certain trajectories in a mobile communication system. The mapping of the predicted values with an actual environment may be done, for example but not limited to, by a use of polylines and lane segments from a dynamic lane model (DLM) or other various types of road graphs models for each requesting service in the UE. In this case, the exchange of information between the UE's service and the provider may be done in a similar way to exchanging lane-relevant information as it is done with DLM or with other road graphs, where the additional information about predicted future courses of the QoS is mapped to a three-dimensional lane segment and a polyline within it.

In some embodiments, the determining comprises predicting the future course further based on former a time and load situation in the mobile communication system along the predicted trajectory. The prediction can take multiple historical situations into account and may hence become more reliable. The information related to the future course may comprise information related to a QoS of a service to be initiated over a certain time interval in some embodiments. As laid out above, in some scenarios it makes sense to only start a service if service specific QoS can be guaranteed with a certain confidence over a certain time interval.

Some embodiments further provide an apparatus for user equipment, UE, in a mobile communication system. The apparatus comprises one or more interfaces configured to communicate in the mobile communication system. The apparatus further comprises a control module configured to control the one or more interfaces and the control module is further configured to perform one of the methods described herein.

Another embodiment is an apparatus for service provision in a mobile communication system. The apparatus comprises one or more interfaces configured to communicate in the mobile communication system and a control module configured to control one or more interfaces. The control module is further configured to perform one of the methods described herein.

A vehicle and/or a network component (UE, base station, relay station, etc.), which comprises one of the apparatuses described herein can be another embodiment. Yet another embodiment is a system comprising the above-described apparatuses and a method for a system comprising the above-described methods.

Some embodiments further provide a computer program having a program code for performing one or more of the above-described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Some other features or aspects will be described using the following non-limiting embodiments of apparatuses or methods or computer programs or computer program products by way of example only, and with reference to the accompanying figures.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an embodiment of a method 10 for user equipment 100, UE, in a mobile communication system. The method 10 comprises using 12 a service with a set of quality of service, QoS, requirements in the mobile communication system. The method 10 further comprises receiving 14 information related to at least one future course of the QoS provisioning of the service from the mobile communication system and adapting 16 the service based on the information related to the at least one future course of the QoS and based on the set of QoS requirements.

Figure 2:
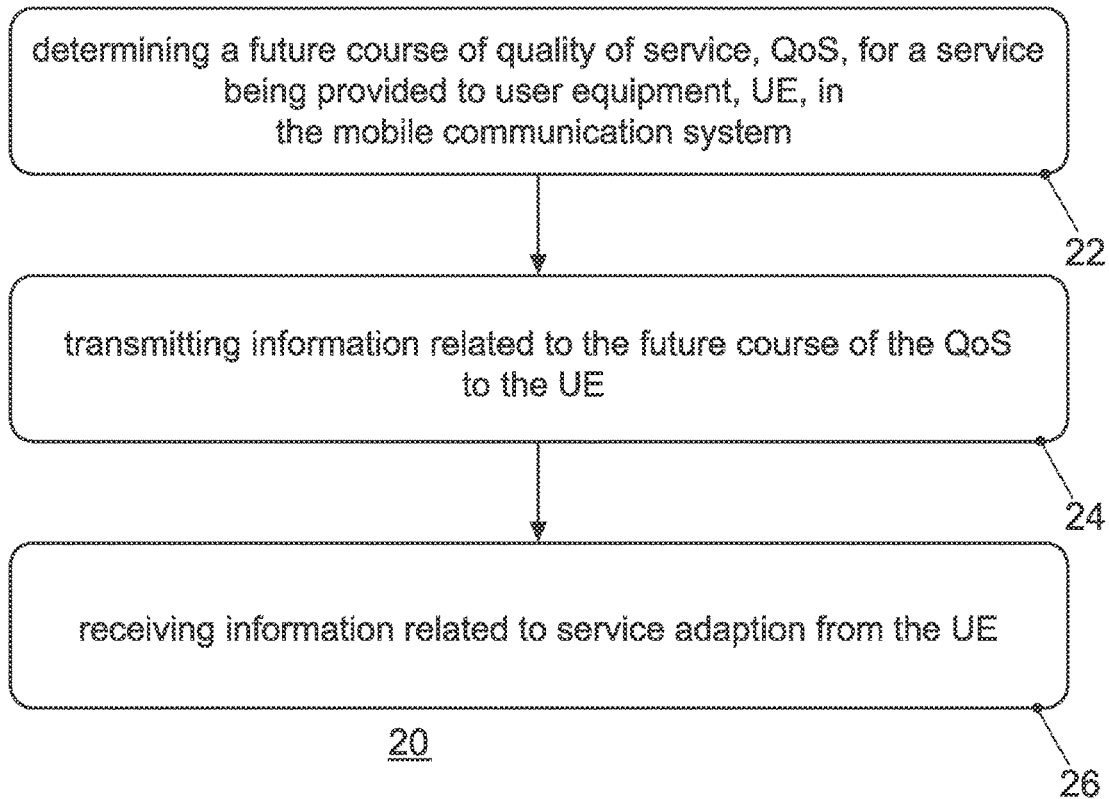
FIG. 2 illustrates a block diagram of an embodiment of a method for service provision.

FIG. 2 illustrates a block diagram of an embodiment of a method 20 for service provision. The method 20 for service provision in a mobile communication system 400 comprises determining 22 at least one future course of QoS for a service being provided to a UE 100 in the mobile communication system 400. The method 20 further comprises transmitting 24 information related to the at least one future course of the QoS to the UE 100 and receiving 26 information related to service adaption from the UE 100.

Figure 3:
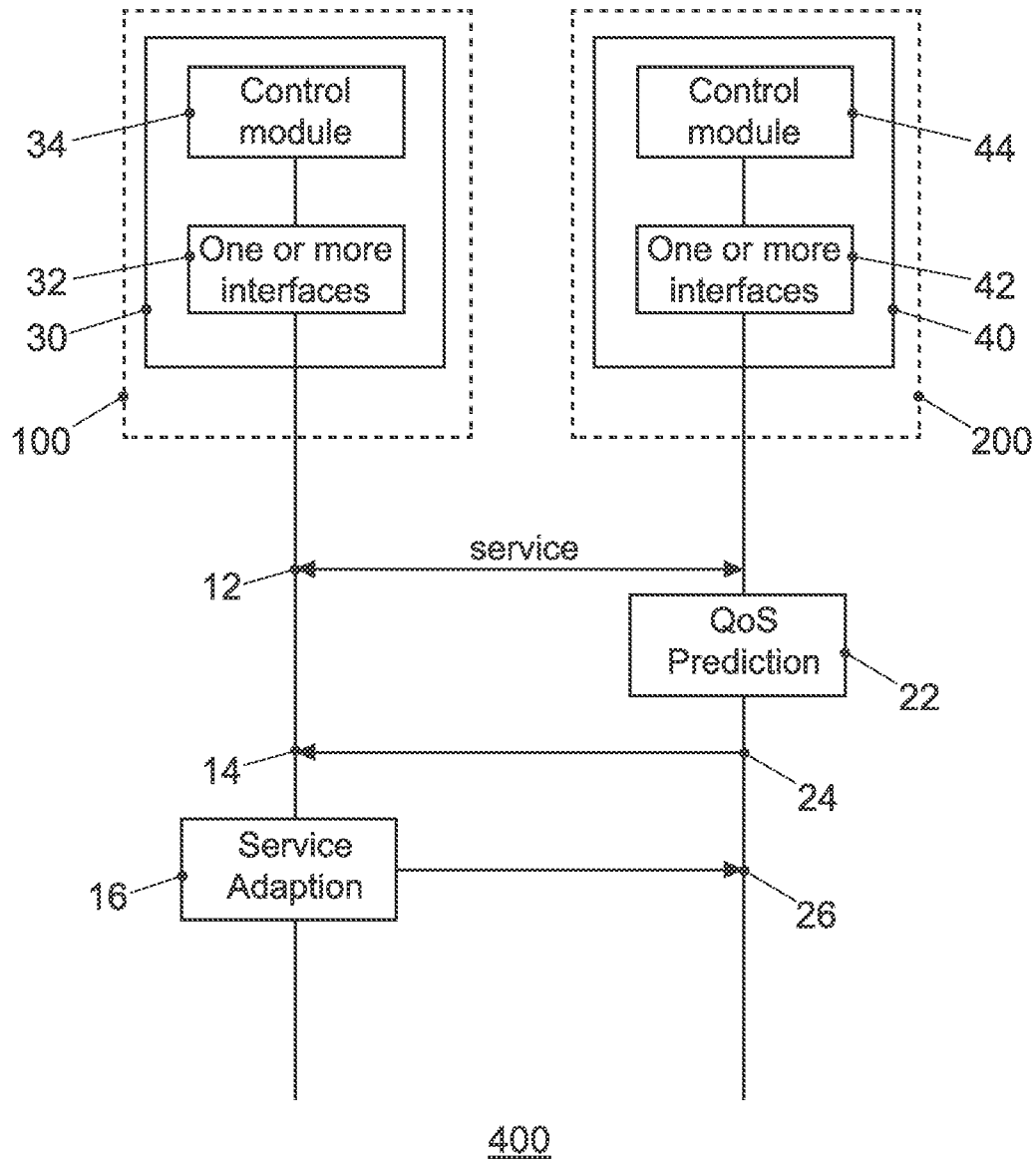
FIG. 3 shows an embodiment of an apparatus for a UE, an embodiment of an apparatus for service provision, and an embodiment of a system.

The mobile communication system 400, as shown in FIG. 3, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs. A base station transceiver can be operable or configured to communicate with one or more active mobile transceivers/vehicles 100 and a base station transceiver can be located in or adjacent to a coverage area of another base station transceiver, e.g., a macro cell base station transceiver or small cell base station transceiver.

Hence, embodiments may provide a mobile communication system 400 comprising two or more mobile transceivers/vehicles 100 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A vehicle may correspond to any conceivable means for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100 may communicate directly with each other, i.e., without involving any base station transceiver, which is also referred to as Device-to-Device (D2D) communication. An example of D2D is direct communication between vehicles, also referred to as Vehicle-to-Vehicle communication (V2V), car-to-car, Dedicated Short Range Communication (DSRC), respectively. Technologies enabling such D2D-communication include 802.11p, 3GPP system (4G, 5G, NR and beyond), etc.

FIG. 3 shows an embodiment of an apparatus 30 for a UE 100, an embodiment of an apparatus 40 for service provision, and an embodiment of a system 400. The apparatus 30 for the UE 100 comprises one or more interfaces 32 configured to communicate in the mobile communication system 400. The apparatus 30 further comprises a control module 34, which is coupled to the one or more interfaces 32 and which is configured to control the one or more interfaces 32. The control module 34 is further configured to perform one of the methods 10 as described herein.

The apparatus 40 for service provision in a mobile communication system 400 comprises one or more interfaces 42, which are configured to communicate in the mobile communication system 400. The apparatus 40 further comprises a control module 44, which is coupled to the one or more interfaces 42 and which is configured to control the one or more interfaces 42. The control module 44 is further configured to perform one of the methods 20 as described herein. The apparatus 40 may be comprised in a base station, a NodeB, a UE, a relay station, or any service coordinating network entity in embodiments. A further embodiment is a vehicle comprising the apparatus 30 and/or the apparatus 40.

In some embodiments, the one or more interfaces 32, 42 may correspond to any means for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas, etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, application requirements, trigger indications, requests, message interface configurations, feedback, information related to control commands, QoS requirements, QoS time courses, QoS maps, etc.

As shown in FIG. 3 the respective one or more interfaces 32, 42 are coupled to the respective control modules 34, 44 at the apparatuses 30, 40. In some embodiments, the control modules 34, 44 may be implemented using one or more processing units, one or more processing devices, any means for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general-purpose processor, a Digital Signal Processor (DSP), a micro-controller, etc.

FIG. 3 also shows an embodiment of a system 400 comprising embodiments of UE 100, and a base station 200 comprising the apparatus 20. In embodiments, communication, i.e., transmission, reception or both, may take place among mobile transceivers/vehicles 100 directly and/or between mobile transceivers/vehicles 100 and a network component (infrastructure or mobile transceiver, e.g., a base station, a network server, a backend server, etc.). Such communication may make use of a mobile communication system 400. Such communication may be carried out directly, e.g., by means of Device-to-Device (D2D) communication, which may also comprise Vehicle-to-Vehicle (V2V) or car-to-car communication in case of vehicles 100. Such communication may be carried out using the specifications of a mobile communication system 400.

In some embodiments, the one or more interfaces 32, 42 can be configured to wirelessly communicate in the mobile communication system 400. In order to do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

FIG. 3 also illustrates the steps of methods 10 and 20 as described above. The apparatus 30 of the UE 100 uses 12 a service with a set of quality of service, QoS, requirements. The service is provided by apparatus 40, which can be located at a base station 200, for example. The service requires a certain data rate and latency, or communication-relevant parameters is general, which are known to the UE 100 and base station 200. In some embodiments other QoS requirements may apply depending on the nature of the service. Example for QoS requirements or parameters are average or instantaneous data rate, bit error rate, frame error rate, latency, signal-to-noise ratio, signal-to-interference ratio, signal-to-noise-and-interference ratio, receive power strength at either or both sides, etc.

In an embodiment, the UE 100 may be a vehicle and the apparatus for service provision may be located at a base station 200 linking a remote driving center offering tele operated driving to the vehicle 100. The service may accordingly be a video service for tele-operated driving requiring a certain data rate and latency, so the remote operator can react to the respective traffic situation along the route of the vehicle. The apparatus determines or predicts 22 a future course of quality of service, QoS, and corresponding tolerance intervals, expected outage statistics, i.e., such information may enable an estimation of a probability of non-delivery of the promised QoS for the service being provided to the vehicle 100. The base station 200 then converts the predicted parameters in an agreed, suitable, and understandable subset of parameters for the UE 100 and transmits 24 the converted information related to the future course of the QoS to the UE/vehicle 100. At the vehicle's side the information related to a future course of the QoS of the service is accordingly received 14. Based on the information related to the future course of the QoS and based on the set of QoS requirements the service can then be accordingly adapted 16. For example, consequences of a possible prediction error may be evaluated. Corresponding information on the service adaption is received by the base station 200 in an agreed, suitable an understandable way. In the embodiment of tele-operated driving such adaption may be decreasing the video data rate to keep up a latency requirement, e.g., by changing a real-time video quality parameter or even by not transmitting video from a rear-view camera and rely on sensor data (e.g. radar or lidar) instead. Other adaptions may be decreasing a top speed of the vehicle, changing the route, decreasing a data rate by switching off certain data sources, switching from tele-operated to manual or automated driving, etc.

In other embodiments other services and according adaptions are conceivable. For example, a data rate and buffer size at the UE 100 may be increased if the future QoS course indicates decrease of a data rate. Increasing data rate and buffer may enable service continuity, e.g., for a video streaming service when the UE 100 enters a no coverage region (e.g. in a train entering a tunnel).

Further embodiments may use one more parameters, which define what kind of distribution of the failure occurs, e.g. random failures or blocks of failures. Since a user-service may handle rare failures differently and with a different success than block failures. A user application or service may be able to renegotiate higher cost for some time-space failures if due to failures the function on the UE side needs higher guarantee at some specific points of time and space.

Figure 4:
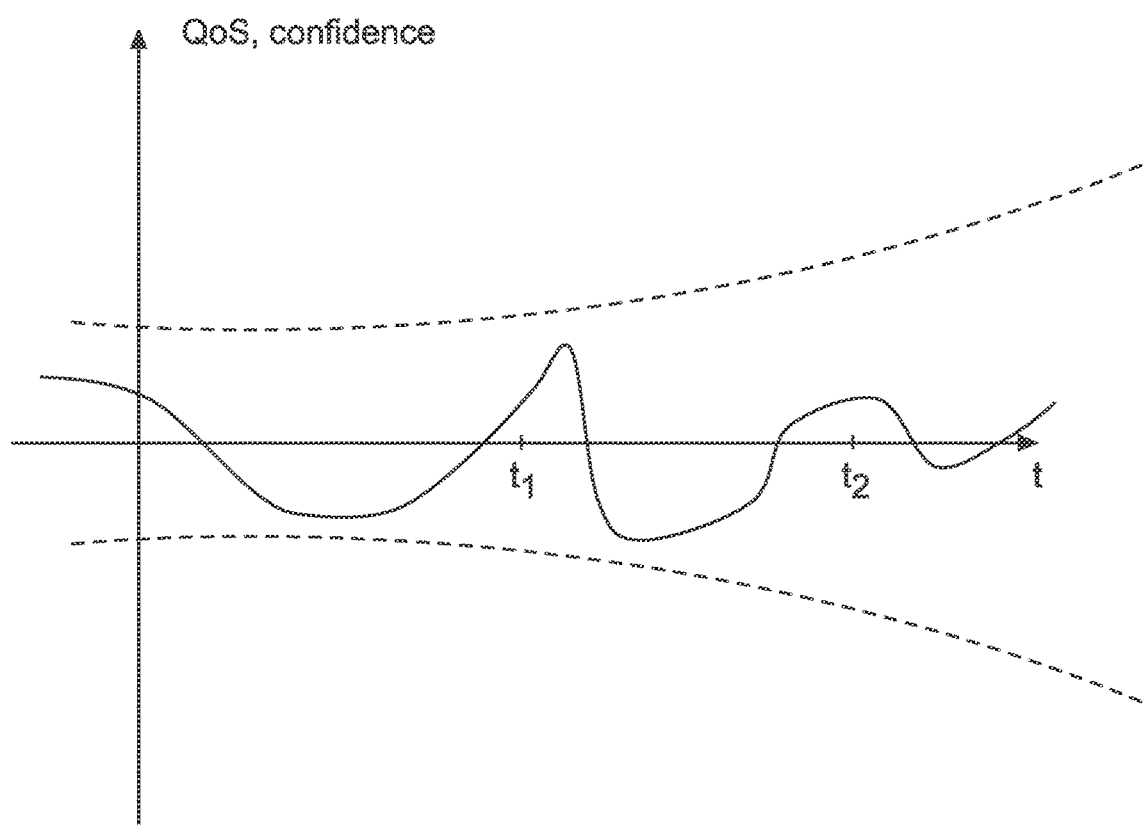
FIG. 4 illustrates an example of future time courses of a QoS in an embodiment.

FIG. 4 illustrates an example of future time courses of a QoS in an embodiment. FIG. 4 shows a view chart with time on the abscissae and QoS (e.g., in terms of data rate or latency) on the ordinate. The future course of QoS is shown using a solid line in FIG. 4, where positive values indicate improvements and negative values indicate deterioration relative to an initial QoS reference setting of the service. For example, such information may be provided in relation to and initial QoS agreement. The information related to the future course comprises information related to a predicted future trend of the QoS. As further shown in FIG. 4 using a broken line the information related to the future course comprises at least one confidence level or confidence indicator for a predicted future trend of the QoS at a certain time or for a certain time period. In some embodiments, such confidence level or confidence indicator may be given by one or more specific values. For example, the information related to the future course comprises a first higher or more precise confidence level or confidence indicator for a predicted QoS at a first earlier time $t_1$ and a second lower or less precise confidence level or confidence indicator for a predicted QoS at a second later time $t_2$. This may be the case when prediction in the farer future become less reliable. In other embodiments, the opposite can be the case, e.g., when the route of a vehicle leads into a tunnel for which a degradation of QoS can be reliably predicted. As indicated in FIG. 4, the confidence level or confidence indicator may also be provided as a time course, e.g., in terms of a function or a predefined course. In general, the confidence level or confidence indicator may represent a reliability of the predicted QoS. In other words, a probability of service delivery (and/or non-delivery) with the forecasted QoS may be given by the confidence level or indicator. For example, the confidence level or confidence indicator may comprise information about the likelihood and parameters of service delivery and non-delivery.

In some embodiments, there might be more than one course of QoS. The method 20 may comprises determining two or more future courses for the service and transmitting information related to the two or more future courses to the UE. The method 10 may comprise receiving information related to the two or more future courses. The two or more future courses may be based on different parameters (e.g., with different precisions, confidence, time range, time resolution, etc.), which define the course. For example, embodiments may utilize connected functions for vehicles with different requirements. There may be one course with more precise parameters for a nearer/closer time-space (e.g., for the execution of a maneuver) and another, less precise, with course parameters for a farther-away time-space (e.g., pre-planning of maneuver).

In general, a confidence level or confidence indicator and the future time course of the QoS may comprise a reference to one or more predefined courses. Such a predefined course may follow a functional relation defined by the function itself and one or more coefficients or parameters. Signaling can then be efficiently carried out using the coefficients or parameters, their changes, respectively. For example, only delta-differences may be transmitted instead of absolute values or compared to an originally promised value.

In some embodiments, the method 10 may further comprise receiving information related to one or more predefined courses of QoS. Hence, the network may configure one or more courses based on the prediction, e.g., based on the route of the UE 100 and e.g., based on future location of the UE 100. The information related to the one or more predefined courses may relate to one or more functions over time. Functions may be defined and adapted to the respective situation. Additionally or alternatively, the information related to the one or more predefined courses may relate to a codebook indicating different time courses of QoS. In such embodiments the time course may be freely configured without relying on a functional relation of the QoS over time. In other words, such a codebook may comprise any time course without the need of any functional relation between the course and time. Such a codebook may be configured based on the prediction of the QoS, e.g. based on former QoS trends in the same area (at the same time of day, on the same day of week, under the same network load condition, under the same weather conditions, on the same route, travelling the same direction, traffic situations (as traffic jam after an accident on a highway), etc.) or based on the instantaneous trends (based on the information about planned vehicles trajectory or desired service requirements). Additionally or alternatively, graphs may be used. Decisions may be made using graph theory. For example, with each signaling step a deeper location in a branch of a graph tree is addressed, decreasing a number of available choices. For example, embodiments may exchange only possible choices, i.e., remaining branches in the graph. The information related to the one or more predefined courses may relates to a graph or a dynamic lane model.

Incremental changes to a time course may be signaled in some embodiments. A time course that had already been signaled to a UE 100 in the past may be reused for the future and adaptations may be signaled, e.g., parameter or coefficient updates (scaling, stretching, providing incremental differences with respect to the baseline).

In some embodiments, the determining 22 of the future QoS time course may comprise predicting the future course based on a history of QoS for the service of the UE 100. Such history may comprise a statistical evaluation of former services under similar conditions (time, load, weather, route, traffic situation, etc.). For example, the prediction of the future course can be based on a predicted trajectory of the UE 100 and former QoS data along the predicted trajectory. Former a time and load situations in the mobile communication system 400 along the predicted trajectory may as well be considered. The signaling may be based on an adaptive codebook. For example, the codebook or one or more functional relations may be configured using higher layer (or second-order) signaling, e.g., Radio Resource Control (RRC) in 3GPP. The codebook/function may then be adapted on a coarse time scale to certain load situations in the network, or to different route that are traveled by the UE 100, to different times of day or days of week, etc. Lower layer (or first order) signaling may then be used for the actual signaling of the course using a codebook reference.

It is to be noted that the above consideration related to examples of a future time course of QoS and how it can be efficiently signaled in a mobile communication system 400. Particularly in the vehicular scenario a route that is travelled by the vehicle may be known. Therefore, the future QoS for a requested service might not be only related to time but to location or distance, telling a vehicle how the future QoS is developing along the route ahead. In some embodiments, the information related to the future time course of the QoS may hence be information on the QoS development along the route ahead. In even further embodiments the information related to the future time course of the QoS may comprise a QoS map of the surrounding of the vehicle telling the vehicle the QoS situation when travelling different paths. There may be a multitude of such maps for a single UE for a multitude of requested services. In a tele-operated driving scenario therefore the predicted QoS may be taken into account when planning the future route. In other words, another service adaption may be the chance of a route in order to maintain a certain QoS.

In further embodiments, the information related to the future course may comprise information related to a QoS of a service to be initiated over a certain time interval. For example, if a service for tele-operated driving is to be initiated a certain QoS (e.g., a minimum data rate at a maximum latency) may be necessary for safety reasons. If the network cannot guaranty such QoS over an expected time interval (e.g., a couple of minutes in a tele-operated parking scenario), another service or another access technology may be used. Hence, a UE may request such a service and the network may respond with according information, confidence, respectively.

As already mentioned, in some embodiments, the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a (non-transitory) computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods. The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE NUMERALS 10 method for user equipment
12 using a service with a set of quality of service, QoS, requirements in the mobile communication system
14 receiving information related to a future course of the QoS of the service from the mobile communication system
16 adapting the service based on the information related to the future course of the QoS and based on the set of QoS requirements
20 method for service provision in a mobile communication system
22 determining a future course of quality of service, QoS, for a service being provided to user equipment in the mobile communication system
24 transmitting information related to the future course of the QoS to the UE
26 receiving information related to service adaption from the UE
30 apparatus for user equipment
32 one or more interfaces
34 control module
40 apparatus for service provision
42 one or more interfaces
44 control module
100 user equipment
200 base station
400 mobile communication system

What is claimed is:

1. A method for user equipment, UE, in a mobile communication system, the method comprising:
using a service with a set of quality of service, QoS, requirements in the mobile communication system;
receiving information related to at least one predefined course of a QoS provisioning of the service from the mobile communication system;
wherein the information related to a respective predefined course comprises at least one confidence level or confidence indicator for a respective predicted future trend of the QoS at a certain time or for a certain time period; and
adapting the service based on the information related to the at least one predefined course of the QoS, and based on the set of QoS requirements.

2. The method of claim 1, wherein the information related to the predefined course comprises a first higher or more precise confidence level or confidence indicator for a predicted QoS at a first earlier time t1 and a second lower or less precise confidence level or confidence indicator for a predicted QoS at a second later time t2.

3. The method of claim 1, wherein the information related to the ene-ormeore-predefined-courses at least one predefined course of QoS relates to one or more functions over time, wherein the information related to the ene-ormere-predefined-courses at least one predefined course of QoS relates to a codebook indicating different time courses of QoS, wherein the information related to the ene-er-mere-predefined-courses at least one predefined course of QoS relates to a dynamic lane model, or wherein the information related to the ene-ormeore-predefined-courses at least one predefined course of QoS relates to a graph.

4. The method of claim 1, wherein the information related to the predefined course comprises information related to a QoS of a service to be initiated over a certain time interval.

5. A method for service provision in a mobile communication system, the method comprising:
predicting at least one future course of quality of service, QoS, for a service being provided to user equipment, UE, in the mobile communication system, based on a history of QoS for the service of the UE;

transmitting information related to the at least one predicted future course of the QoS to the UE; and receiving information related to service adaption from the UE.

6. The method of claim 5, comprising predicting a respective future course based on a predicted trajectory of the UE and former QoS data along the predicted trajectory.

7. The method of claim 6, comprising predicting the respective future course further based on a former time and load situation in the mobile communication system along the predicted trajectory.

8. An apparatus for user equipment, UE, in a mobile communication system, the apparatus comprising:

one or more interfaces configured to communicate in the mobile communication system; and a control module configured to control the one or more interfaces, wherein the control module is further configured to:

use a service with a set of quality of service, QoS, requirements in the mobile communication system;

receive information related to at least one predefined course of a QoS provisioning of the service from the mobile communication system;

wherein the information related to a respective predefined course comprises at least one confidence level or confidence indicator for a respective predicted future trend of the QoS at a certain time or for a certain time period; and adapt the service based on the information related to the at least one predefined course of the QoS, and based on the set of QoS requirements.

9. An apparatus for service provision in a mobile communication system, the apparatus comprising:

one or more interfaces configured to communicate in the mobile communication system; and a control module configured to control the one or more interfaces, wherein the control module is further configured:

predicting at least one future course of quality of service, QoS, for a service being provided to user equipment, UE, in the mobile communication system, based on a history of QoS for the service of the UE;

transmit information related to the at least one predicted future course of the QoS to the UE; and receive information related to service adaption from the UE.

10. A vehicle comprising the apparatus of claim 8.

11. A non-transitory storage medium having instructions that when executed on a computer, a processor, or a programmable hardware component cause the computer, processor, or programmable hardware component to conduct the method of claim 1.

12. A vehicle comprising the apparatus of claim 9.

13. A non-transitory storage medium having instructions that when executed on a computer, a processor, or a programmable hardware component cause the computer, processor, or programmable hardware component to conduct the method of claim 5.

* * * * *